United States Patent [19]
Salvo

[11] 3,845,686
[45] Nov. 5, 1974

[54] INTONATION GUIDE FOR PLAYER OF STRING INSTRUMENT

[76] Inventor: Andrew D. Salvo, 10 Gloria Pl., East Haven, Conn. 06512

[22] Filed: Aug. 1, 1973

[21] Appl. No.: 384,587

[52] U.S. Cl. .................................. 84/485, 84/314
[51] Int. Cl. ........................................ G10b 15/00
[58] Field of Search ............ 84/274, 314, 470, 477, 84/478, 485

[56] References Cited
UNITED STATES PATENTS

| | | | |
|---|---|---|---|
| 1,095,900 | 5/1914 | Manby | 84/314 |
| 1,775,472 | 9/1930 | Ostrovsky | 84/314 |
| 3,196,729 | 7/1965 | Burns et al | 84/171 |
| 3,403,591 | 10/1968 | Weitzner | 84/485 |
| 3,503,296 | 3/1970 | Schmoyer et al | 84/478 |
| 3,712,952 | 1/1973 | Terlinde | 84/314 |

*Primary Examiner*—Lawrence R. Franklin
*Attorney, Agent, or Firm*—Walter Spruegel

[57] ABSTRACT

Intonation guide providing a signal element, and a circuit therefor, including at least one normally open switch with a tab mounted on the fingerboard of a string instrument and located within pressure reach of a player's finger when fingering a string correctly for playing a particular note at correct pitch, with the tab, when pressure-activated by the player's finger, closing the switch for a signal emission.

8 Claims, 11 Drawing Figures

PATENTED NOV 5 1974
3,845,686
SHEET 1 OF 2
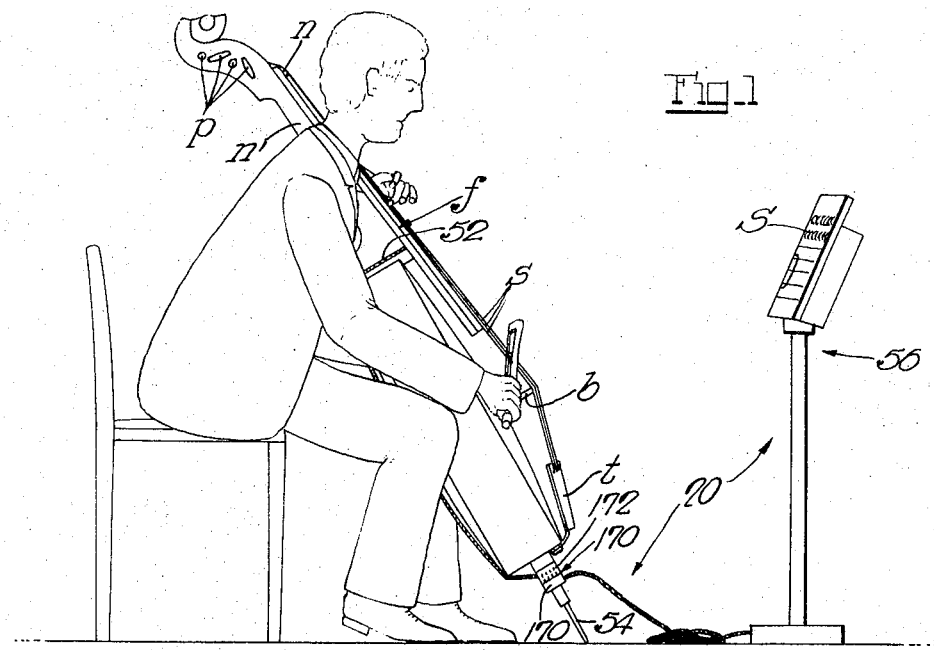
Fig. 1
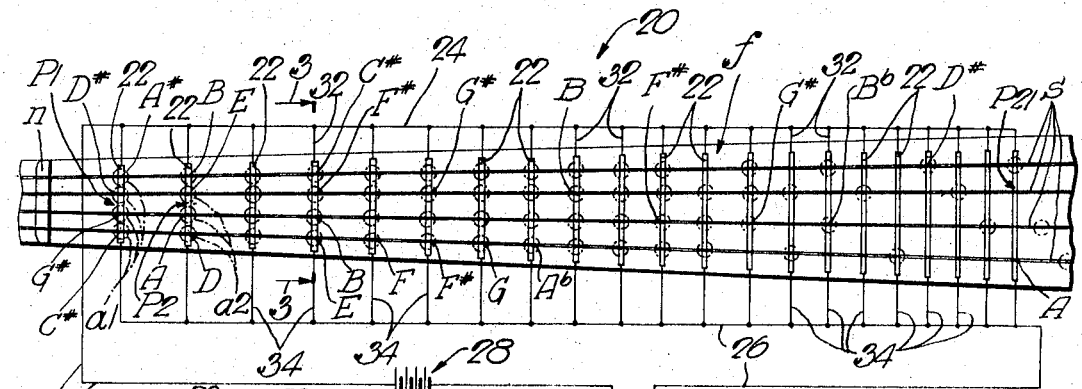
Fig. 2
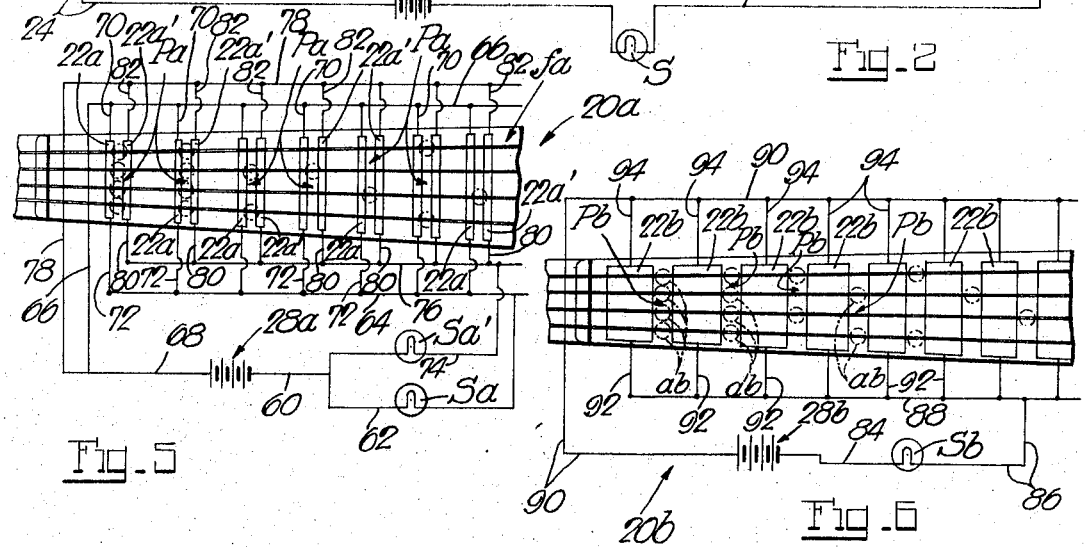
Fig. 5
Fig. 6

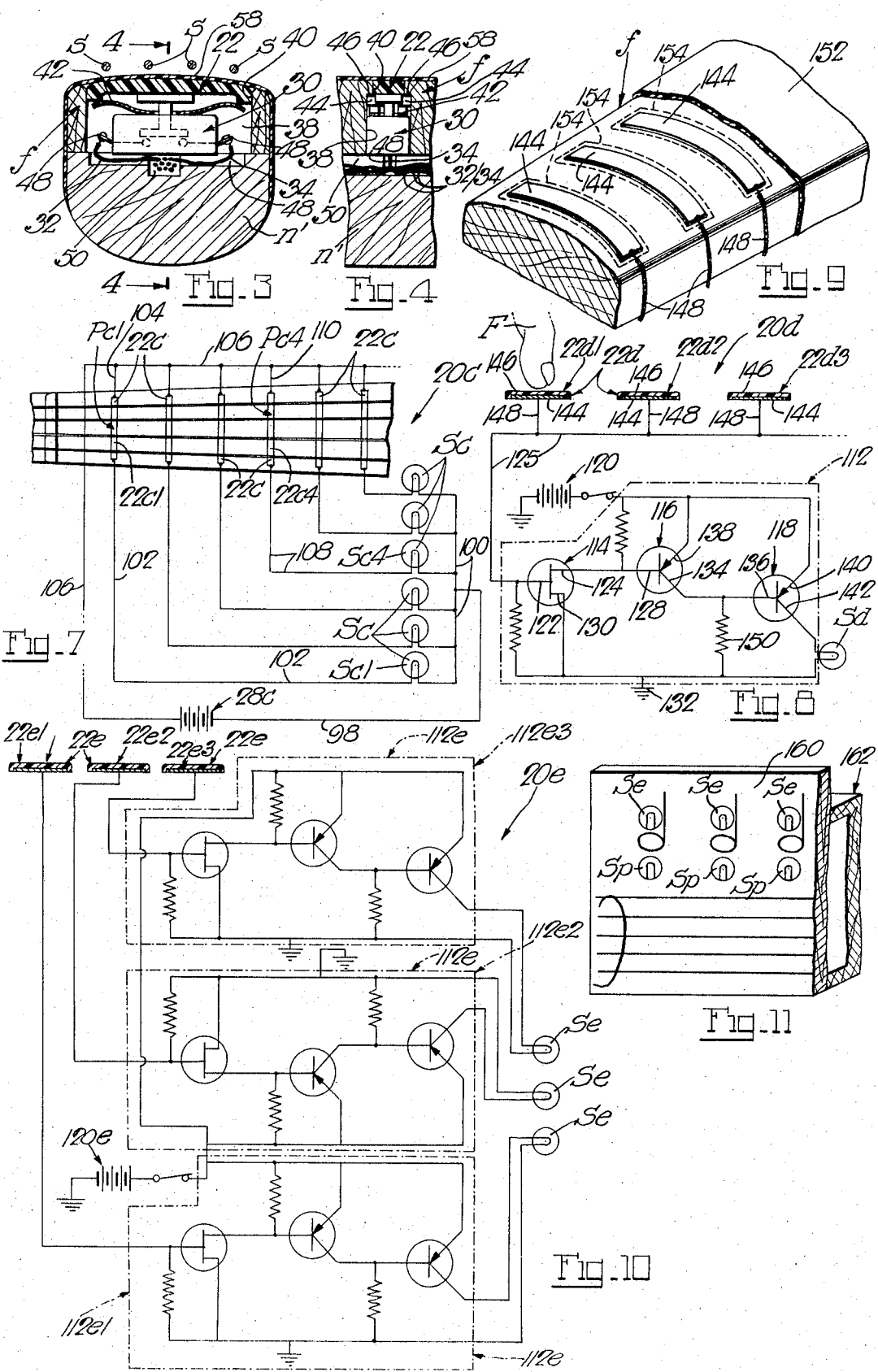

INTONATION GUIDE FOR PLAYER OF STRING INSTRUMENT

This invention relates to a student's aide toward acquiring correct pitch intonation on a string instrument, and more particularly to a device for perceptible signal indication to the student of his or her correct or wrong intonation.

The invention is related to string instruments, such as violins or cellos, for example, on which pitch intonation is solely under fingering control of the player, and correct pitch intonation is acquired only if the player's ears can distinguish between correct or incorrect pitch of any played note. To get a student player's ears trained to distinguish between correct or incorrect pitch of any played note is among the most basic and oftentimes difficult tasks toward progress in playing an instrument. While a tutor's occasional and preferably periodic assistance is, of course, most helpful in this respect, the student practices on the instrument without a tutor's personal supervision usually for a much longer time during which the student makes little, if any, progress toward gauging correct pitch intonation by his or her ears.

It is the primary object of the present invention to provide an intonation guide available to a student player and responsive to his or her fingering of the strings to give the student an immediate and readily perceptible signal indication of the ensuing correct or incorrect pitch of any played note, with the student receiving no help whatsoever from the guide in initially placing any of his or her fingers on any particular string for intended playing of any particular note. With this arrangement, the student is compelled to practice privately for direct and correct fingering of the strings, as is required for accomplished playing, without assistance from the guide, yet the guide is fully as effective as a qualified tutor's personal supervision in indicating to the student the correctness or incorrectness of his or her direct fingering of the strings. Therefore, with this guide a student player may spend as much time as desired in privately practicing on the instrument as effectively as though under constant personal supervision of a tutor.

It is another object of the present invention to provide an intonation guide which features signal means with electrical circuitry, including switch tabs, therefor, of which the tabs are located on the fingerboard of a string instrument underneath the strings thereon, and the circuitry leads from the tabs and instrument to the signal means nearby and within ready signal perception of the player of the instrument, with the circuitry being normally open, and being, for signal emission, closed only by the player when fingering any of the strings within reach of a tab therebeneath, and the tabs being by their relative location on the fingerboard arranged in a desired touch pattern. With this set-up, the tabs on the fingerboard may be arranged in a touch pattern for signal emission when correctly fingering any string for true-pitch playing of any particular note, or, alternatively, for signal emission when incorrectly fingering any string for playing any intended particular note. Further, because the correct fingering positions for playing all notes on the instrument are in preassigned series across the strings at predetermined spacing from each other longitudinally of the fingerboard, each tab may advantageously extend across all strings in the same accurate coordination with each fingering position of the associated series, so that this tab and the associated circuitry and signal means will properly function for any fingering position in the series.

It is a further object of the present invention to provide an intonation guide in which the signal means and electrical circuitry, including the switch tabs, are arranged in two separate sets, of which the tabs of one set are located on one side, and the tabs of the other set are located on the opposite side, of all correct fingering positions encompassed by the touch pattern of the tabs, with associated tabs of both sets on the opposite sides of each correct fingering position being spaced to be simultaneously within reach of the player's finger when in correct fingering position, but to be out of simultaneous reach of the player's finger when in a position deviating from correct fingering position. With this arrangement, the player will perceive two, preferably different, signals when fingering correctly, and will perceive only one signal when fingering incorrectly, and the associated tabs of each pair may be spaced as desired to signify, by a single signal emission, a player's incorrect fingering, and even fingering which is only the least bit off correct fingering position so as to require particularly accurate fingering in order to obtain a dual-signal indication of correct fingering.

Another object of the present invention is to provide an intonation guide in which each tab is in any event part of a normally open switch in the circuitry of the signal means, but in the preferred form of the circuitry each tab is part of a capacitor the other part of which is the player's finger in an induction field which prevails in a player's usual surroundings, and the rest of the switch and circuitry is in the form of a multi-stage amplifier powered from an electric source and connected with the signal means, with the player's finger, when in close proximity to the tab, inducing in the latter a signal which is coupled with, and amplified by, the amplifier to cause the latter to draw current from the source through the signal means for a signal emission therefrom. This type of circuitry is, in comparision with circuitry under mechanical switch control, particularly advantageous on several counts. Thus, the components of this circuitry, including an amplifier of preferred multi-stage transistor type, involve conventional standard parts of the lowest cost and little bulk. Further, this circuitry lends itself to assembly with an instrument at particular ease and without requiring any change of the instrument in its classic construction and appearance or affecting its playing quality, in that only the tabs of no more than foil thickness require mounting, and even only removable cementing, on the fingerboard of the instrument, and all other components, including the signal means, may advantageously be provided in a common package or unit of light weight and little bulk remote from the instrument, with the tabs being connected with the unit by slender wires which on clearing the fingerboard are advantageously gathered into a single strand that may be extended to the unit in a manner which is least, if at all, conspicuous and in any event keeps the strand from interfering in any way with a player's accustomed handling and use of the instrument, and the tabs with the wires therefrom to their lead-off from the fingerboard being kept imperceptible to the player's touch in playing the instrument and preferably also hidden from view.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a view of a string instrument being played with an intonation guide embodying the invention;

FIG. 2 is a diagrammatic view of the intonation guide in its assembled relation with the fingerboard of a string instrument;

FIG. 3 is an enlarged section through the fingerboard and guide taken substantially on the line 3—3 of FIG. 2;

FIG. 4 is a fragmentary section taken substantially on the line 4—4 of FIG. 3;

FIGS. 5 to 7 are fragmentary diagrammatic views of different modified intonation guides of the invention in their assembled relation with fingerboards of string instruments;

FIG. 8 is a wiring diagram of preferred signal circuitry of an intonation guide;

FIG. 9 is a fragmentary perspective view of a fingerboard of a string instrument with installed parts of the signal circuitry of FIG. 8;

FIG. 10 is a wiring diagram of signal circuitry of an intonation guide which is modified from that of FIG. 8; and FIG. 11 is a fragmentary perspective view of a unit component of an intonation guide.

Referring to the drawings, and more particularly to FIG. 1 thereof, there is shown a student player practicing on a string instrument, in this instance a cello, with the aid of an intonation guide 20 according to the invention. The student player is involved in the difficult, but most important, task of fingering the strings s of the instrument for playing various notes at the correct pitch, with the guide 20 indicating to the student player the correctness or incorrectness of his fingering for true-pitch playing of every note he selects to play. To this end, the intonation guide 20 provides at least one electric signal element S, such as a light bulb for the emission of a preferred soundless light signal within ready perception of the player of the instrument, and circuitry for the signal element, including a plurality of normally open switches with associated tabs 22 on the fingerboard f of the instrument (FIG. 2), with the tabs 22 being located on the fingerboard to be within pressure reach of the player's finger when fingering the strings correctly for playing notes at the correct pitch, for example, and to be out of pressure reach of the player's finger when fingering the strings for unintended off-pitch playing of notes, and each tab, when within pressure reach of the player's finger, functioning to close the associated switch and thereby the circuitry for the emission of a signal from the signal element S.

Referring now to FIG. 2, the tabs 22 are shown mounted on the fingerboard f of the instrument, and the circuitry of the signal element S is shown diagrammatically. The strings s of the instrument extend from the pegs p (FIG. 1) over the usual nut n on the fingerboard, then over the latter to the bridge b and to the tailpiece t, and the strings s are traditionally fingered in series of finger positions at predetermined spacing, respectively, from the nut n for playing associated groups of notes, respectively. Thus, the series P1 of lowest finger positions next to the nut n is represented in FIG. 2 by the dot-and-dash line finger-touch areas a1 on the strings for playing, on the exemplary cello, the notes C# (C sharp), G#, D# and A# on the respective strings s. The next series P2 of finger positions farther spaced from the nut n is represented by the dot-and-dash line finger-touch areas a2 on the strings s for playing the notes D, A, E and B on the respective strings s. Further series of finger positions, in this instance up to P21, are shown in FIG. 2. The tabs 22 extend on the fingerboard f across all the strings s, with each tab being in this instance centered on a series of finger positions so as to be within pressure reach of the player's finger in any position of the series and thereby close the associated switch for the emission of a signal from the signal element S. The circuit of the signal element S provides in this instance the leads 24 and 26, with the lead 26 having the signal element S interposed, and both leads being connected with the positive and negative terminals of a suitable DC power source, such as a battery 28, for example, and the switches associated with the respective tabs 22 are in this instance mechanical switches 30 (FIG. 3) which are connected across the leads 24 and 26 in parallel with each other. The switches 30 are not shown in FIG. 2, but their connection across the circuit leads 24 and 26 is indicated by lines 32 and 34 which for the sake of simplicity of illustration are shown leading from the opposite ends of the associated tabs 22. Thus, if the player of the instrument should, for example, finger one of the strings at or sufficiently close to a touch area a2 in the series P2 of finger positions to reach the tab 22 thereat, the associated switch, and thereby the circuit of the signal element S, will be closed for a signal emission to indicate to the player that his fingering is correct. Alternatively, if the player's finger should be sufficiently off correct fingering position for producing the same note at incorrect pitch, the particular tab is out of reach of the player's finger pressure and no signal is emitted to indicate to the player that his fingering is off.

Reference is now had to FIG. 3 which shows one of the switches 30 and its associated tab 22 installed in the fingerboard f of the instrument. Thus, the switch 30, which may be of miniature push button type, is located in a recess 38 in back of the fingerboard f, and in this instance rests on the neck n' on which the fingerboard is mounted as usual (see also FIG. 4). The tab 22 is in this instance a molded piece or strip of insulating plastic which is received in a slot 40 in the top of the fingerboard, with a spring 42 normally urging the tab into the projected position in FIG. 3 in which end ears 44 on the tab bear against top shoulders 46 in the recess 38. The terminals 48 of the switch are connected with the wires or leads 32 and 34 which in a transverse groove 48 are led to a longitudinal groove 50, both in the neck n' of the instrument in this instance, with the wires 32 and 34 extending with wires 32 and 34 from other switches 30 in the groove 50 in which they may also be suitably joined to the circuit leads 24 and 26, with these leads being in this instance led through a hole in the neck n' away from the latter as an insulated strand 52 (FIG. 1) for their connection with the battery 28 and the signal element S. The strand 52 is in this instance led around the back of the instrument (FIG. 1) and preferably tied to the usual end pin 54 thereof for holding the strand to the instrument and out of interference with a player's accustomed handling of the instrument in playing the same, with the strand 52 continuing in this instance to a stand 56 for connection of the circuit leads 24 and 26 with the battery 28 and signal element S therein, and the signal element in the exemplary form of a light bulb being exposed to the player's view.

The tabs 22 are in the present example provided at the series of finger positions from P1 to P21 and thus cover several playing positions starting with the first position. Of course, the tabs may be provided at any other number of series of finger positions, but should always cover the first playing position and preferably one or more next higher playing positions in which the student player will be involved for his own good. Once a student player becomes proficient with the aid of the present intonation guide to distinguish by ear the correct pitch of any played note in the lower playing positions, the player usually requires no further aid from the intonation guide in judging by his or her ear correct fingering of the strings in the higher playing positions.

The fingerboard f and tabs 22 thereon are preferably covered by sheeting 58 of plastic or the like (FIG. 3) which is sufficiently flexible to give way to the player's finger pressure on a string above a tab 22 to depress the latter for closure of the associated switch 30. In this connection, a student player is taught to press the string he fingers against the fingerboard for sound quality of the played note, and this pressure, while concentrated on a particular string, is by the finger also transmitted through the cover sheet 58 to the fingerboard so that any tab within reach of his finger pressure will be depressed sufficiently to close the associated switch. The real purpose of the cover sheet 58 is to hide the tabs 22 from the player's view so that the player is not aided by the intonation guide in initially placing his finger in position on a particular string for intended playing of a particular note, which is a distinct feature of the intonation guide the function of which is to train a student player toward recognizing by ear the correct pitch of any played note pursuant to initially correct fingering of the particular string.

The exemplary intonation guide 20 requires for its installation on a string instrument some changes on the latter which may, however, be kept to a few simple changes. Thus, the present intonation guide 20 requires repeated recessing and slotting of the fingerboard of the instrument as at 38 and 40, and grooving of the neck of the instrument as at 48 and 50 (FIGS. 3 and 4), and to this end requires removal of the fingerboard from, and its subsequent glue-back on, the neck of the instrument, with none of these tasks being formidable ones. Moreover, once the intonation guide has served its purpose, the same may readily be disassembled from the instrument and the latter restored to normal playing without the guide, involving no more than removal of the cover sheet 58 from the fingerboard f and removal of the latter from the neck of the instrument for removal of the parts of the guide, plugging of the slots in the top of the finger board and regluing the latter to the neck of the instrument, or preferably gluing a new fingerboard to this neck.

Reference is now had to FIG. 5, which shows a modified intonation guide 20a that differs from the described intonation guide 20 in that each of the series of finger positions Pa on the fingerboard fa selected for tab coverage is provided with two tabs 22a and 22a' which, though centered on the respective series of finger positions Pa, are spaced from each other so that both will be within pressure reach of the player's finger in a correct fingering position, but only either one will be within pressuure reach of the player's finger in an incorrect fingering position. All tabs 22a are preferably located on one side of the centers of the respective series of finger positions Pa and the other tabs 22a' are located on the opposite sides of the centers of the series of finger positions Pa. Each tab 22a and each tab 22a' is associated with a switch in the same manner in which each tab 22 of the described intonation guide 20 is associated with a switch 30 (FIG. 3). The present intonation guide 20a further provides two signal elements Sa and Sa', and a circuit for each signal element. Both circuits have a common power source in the form of a battery 28a, and the circuit of the signal element Sa provides a lead 60 from one terminal of the battery, a continuing lead 62 in which the signal element Sa is interposed, leads 64 and 66, and a lead 68 which is connected with the other terminal of the battery, with the switches associated with the tabs 22a being by leads 70 and 72 connected across the leads 64 and 66 in parallel with each other. The circuit of the signal element Sa' provides the lead 60 from one side of the battery 28a, a continuing lead 74 in which the signal element Sa' is interposed, leads 76 and 78, and lead 68 to the other side of the battery, with the switches associated with the tabs 22a' being by leads 80 and 82 connected across the leads 76 and 78 in parallel with each other. The circuit of either signal element Sa or Sa' is closed by finger pressure against one of the associated tabs 22a or 22a', as will be readily understood, and the operation of the present intonation guide 20a is readily apparent by now. The paired tabs 22a and 22a' may be, and preferably are, so spaced as to be within simultaneous reach of the player's finger pressure only in particularly accurate fingering position, and only either one of these tabs will be within reach of the player's finger pressure in even very slight off-fingering position which in the intonation guide 20 of FIG. 2 might still elicit a signal emission to indicate correct fingering. Such particularly accurate fingering of the strings to obtain a dual signal emission for a correct fingering indication even surpasses the accuracy of many fingerings of the strings by accomplished players, but the requirement of particularly accurate fingering for a correct-fingering dual-signal indication will, of course, be of lasting benefit to the student player for later accomplished playing. Further, with the tabs 22a being on one side, and the tabs 22a' being on the other side, of the centers of the respective series of finger positions Pa, a player, when fingering incorrectly, will know immediately from the ensuing single signal emission whether be fingered too high or too low, for a single signal emission from the element Sa will indicate fingering on the low side, and a single signal emission from the element Sa' will indicate fingering on the high side. To even more readily bring to the player's attention too-high or too-low fingering, the signal elements Sa and Sa', being preferred light bulbs, are advantageously arranged one on top of the other, with a single light emission from the upper bulb indicating off-fingering on the high side, and a single light emission from the lower bulb indicating off-fingering on the low side. Still further, the signal bulbs Sa and Sa' are preferaby also of different colors.

While in the intonation guide 20 of FIG. 2 the signal element emits a signal when fingering correctly, FIG. 6 shows a further modified intonation guide 20b in which the signal element Sb emits no signal when fingering correctly, but emits a signal when fingering incorrectly. In this modified guide 20b the tabs 22b are arranged between successive series of finger positions Pb of which some finger touch areas are represented by dot-and-dash line circles ab. Associated with each tab 22b is a switch, such as a switch 30 in FIG. 3, for example. The circuit of the signal element Sb provides a lead 84 from one side of a battery 28b, the signal element Sb, a lead 86 and leads 88 and 90 of which lead 90 is connected with the other side of the battery 28b, with the switches associated with the tabs 22b being by leads 92 and 94 connected across the leads 88, 90 in parallel with each other. The operation of the guide 20b is quite apparent by now. Thus, as long as a player fingers correctly as indicated by any of the finger touch areas ab, the tabs 22b are out of pressure reach of the player's finger and no signal will emit from the element Sb. However, if the player's fingering is off, the nearest tab 22b will be within pressure reach of the player's finger and a signal will emit from the element Sb. The spacing of successive tabs 22b may be selected for a signal response to the player's fingering when off, more or less, from very accurate fingering, and may be such as to elicit a signal when the player's fingering is off from very accurate fingering as little as is required in the intonation guide 20a of FIG. 5 to elicit a single signal for an incorrect fingering indication.

While in the described intonation guides 20 and 20b of FIGS. 2 and 6 a single signal element, and in the intonation guide 20a of FIG. 5 dual signal elements, serve for signal indications in any and all series of finger positions encompassed by the guide, FIG. 7 shows a further modified intonation guide 20c which may in all respects be like the guide 20 of FIG. 2, except that there is associated a signal element Sc with each tab 22c for the emission of a signal from the particular element Sc on subjecting the associated tab 22c to the player's finger pressure. As in the other described intonation guides, there is associated with each tab 22c a switch which in the circuitry of the guide is in series connection with the associated signal element Sc. This circuitry is quite clear from FIG. 7, and requires no further specific description. Thus, when the player correctly fingers in any of the positions of the series Pc1, for example, the circuit of the signal element Sc1 is closed via lead 98 from one side of the battery 28c, lead 100, lead 102 with the interposed signal element Sc1, the then closed switch associated with the activated tab 22c1, lead 104, and lead 106 to the other side of the battery 28c. When the player correctly fingers in any of the positions of the series Pc4, for example, the circuit of the signal element Sc4 is closed via lead 98 from one side of the battery 28c, lead 100, lead 108 with the interposed signal element Sc4, the then closed switch associated with the activated tab 22c4, lead 110, and lead 106 to the other side of the battery 28c.

While in the before-described forms of the intonation guide the signal circuitry is controlled by mechanical switches, FIG. 8 shows a further modified intonation guide 20d with preferred signal circuitry which is devoid of any mechanical switch. Thus, the tabs 22d, such as the tabs 22d1, 22d2, 22d3 and succeeding ones, may be located on the fingerboard of a string instrument the same as the tabs 22 on the fingerboard in FIG. 2, and the circuitry is in this instance for a single signal element Sd in preferred light bulb form, with the circuitry including a single switch 112 activated by any of the tabs 22d for closing the signal circuit. The switch 112 is in the form of a multi-stage amplifier which, on receiving and simplifying a signal induced in any of the tabs 22d in a manner described hereinafter, acts to draw current from its power source through the signal element Sd for a signal emission. The amplifier is of preferred multistage transistor type, providing the transistors 114, 116 and 118, and the amplifier is powered from a battery 120 or its equivalent, such as the rectified output of a step-down transformer, for example, which can be plugged into a nearby commercial power line. The transistor 114 is of typical field-effect type, with its gate 122 connected with a lead 125, its drain 124 connected with the base 128 of the transistor 116, and its source 130 connected with ground 132. The collector 134 of transistor 116 is connected with the base 136 of the transistor 118, and the emitters 138 and 140 of the transistors 116 and 118 are connected with the plus side of the power source 120, while the collector 142 of the transistor 118 is connected with the signal element Sd which is also connected with ground 132.

Each tab 22d is part of a capacitor, the other part of which is the player's finger when in sufficiently close proximity to the tab to induce a signal in the latter. The player of the instrument is almost invariably in surroundings in which there is an electromagnetic field of sufficient intensity for such a signal which emanates from the player's finger and is through the capacitor coupled with and amplified by the amplifier. In order to function as a capacitor part, however, each tab 22d provides a conductive metal strip 144 and an insulation cover 146 thereon which is exposed to the player's finger. The conductive strip component 144 of each of the tabs 22d is by a lead 148 connected with the lead 125.

With no input voltage in the form of a signal from the player's finger, the field-effect transistor 114 will conduct its maximum current, activating transistor 116 which diverts the current through the resistor 150 to the plus side of the power supply 120. Transistor 118 is, therefore, cut off and so is the signal element Sd between the collector 142 of transistor 118 and the minus side of the power supply 120. However, when a signal from the player's finger F is coupled to the amplifier, the negative part of the induced signal turns off transistor 114, thereby removing the base current of transistor 116 to turn off the latter. The current through a resistance 150 now flows through the base 136 of transistor 118, enabling the latter to draw current through the signal element Sd for a signal emission. Thus, as long as the player's finger F is in sufficiently close proximity to one of the tabs 22d as shown, a signal will be emitted from the signal element Sd.

The present signal circuitry is highly advantageous on the aforementioned and also other counts. Thus, the conductive strip components 144 of the tabs 22d are preferably of no more than foil thickness for their ready mount, preferably removably by mere cementing, on the fingerboard f (FIG. 9), and the insulating cover components 146 of the tabs 22d are formed by plastic cover sheeting 152 which is applied to the fingerboard conveniently by cementing for ready removal therefrom if desired. Thus, the cover sheet 152 hides the strip parts 144 from the player's view, and due to the thinness of these strip parts 144 the player cannot even feel them when fingering the strings of the instrument. The conductive strip parts 144 of the tabs 22d are preferably electrically shielded in any of various known ways as represented by the dotted lines 154 in FIG. 9, in order that each tab will be in signal-inducing relation with the player's finger only when the latter is above the tab and as close thereto as the finger will be in normally fingering a string thereat for playing a note, which may even be short of the finger actually touching the sheet-covered fingerboard, although in order to acquire good tone quality a student player will be taught to press down on any string sufficiently so that the playing finger will rest on the fingerboard.

Installation of the intonation guide 20d with the present signal circuitry is also particularly easy and requires the least, if any, modification of the instrument. Thus, the application of the tabs 22d to the fingerboard requires no modification whatever of the latter, and the leads 148 running from the conductive strip components 144 of the tabs may laterally be led around the fingerboard underneath the cover sheet 152 thereon (FIG. 9) and passed in inconspicuous taped-on fashion alongside the neck of the instrument, for example, with these leads 148 being at any convenient place connected with the lead 125 which, in turn, is led from the instrument, in any suitable manner and without interfering with a player's accustomed handling of the instrument, to the switch 112, power source 120 and signal element Sd remote from the instrument, such as in a stand 56 (FIG. 1). Of course, and as perhaps preferred, the fingerboard and neck at least of the instrument may be modified to lead the wires from the tabs in drilled holes and cut channels therein to their emergence from the neck n' of the instrument as in FIG. 1, for example, with no further modifications of the instrument required for extension of the wiring to the stand 56.

While in the modified intonation guide 20d of FIG. 8 a single switch 112 and single signal element Sd are operated by any one of the plurality of tabs 22d, FIG. 10 shows another modified intonation guide 20e in which a switch 122e and associated signal element Se are provided for each tab 22e. Thus, each tab 22e is connected with a switch 112e, with the exemplary shown tabs 22e1, 22e2 and 22e3 being connected with the respective switches 112e1, 112e2 and 112e3, and the amplifiers of all switches being powered from the same source 120e. Each switch 112e is in this instance identical with the switch 112 of FIG. 8, wherefore its operation for a signal emission from the associated signal element Se by activation of the associated tab is fully understood without any further description.

The present intonation guide 20e may be installed on a string instrument in much the same fashion in which the guide 20d of FIG. 8 is installed, with the switches 112e, signal elements Se and the power source 120e being preferaby provided in a stand 56 remote from the instrument as in FIG. 1. The tabs 22e may be located on the fingerboard of the instrument the same as the tabs 22 are located on the fingerboard in FIG. 2. Thus, assuming that the tab 22e1, for example, be in place of the tab 22 next to the nut n on the fingerboard of FIG. 2, which covers the series P1 of finger positions, the signal element Se associated with the tab 22e1 will emit a signal in any of the player's correct finger positions of the series P1 to indicate correct fingering to the player. With the next tab 22e2 being located in place of the next tab 22 on the fingerboard of FIG. 2, which covers the series P2 of finger positions, the signal element Se associated with the tab 22e2 will emit a signal in any of the player's correct finger positions of the series P2 to indicate correct fingering by the player. Each tab 22e and associated signal element Se thus covers a particular series of finger positions. The signal elements Se within view of the player may be spaced from each other, and arranged successively, similarly as successive series of finger positions on the fingerboard encompassed by the intonation guide, so that the player may readily identify each series of finger positions with the associated signal element.

The signal elements Se may in this fashion be arranged on a headboard 160 (FIG. 11) on top of a stand like or similar to the stand 56 in FIG. 1, with this headboard forming in this instance part of a box formation 162 in which the switches 112e and the power source 120e may conveniently be mounted. Paired in this instance with each of the signal elements Se on the headboard 160 is another signal element Sp, with these paired signal elements being arranged for operation of an intonation guide in the manner exemplified in FIG. 5 in which a player's correct fingering is indicated by a dual signal and incorrect fingering is indicated by a single signal.

While the various forms of the intonation guide relate to an exemplary cello, it is, of course, fully within the purview of the invention to apply the guide to any other string instrument, such as a violin, for example. Also, since in the case of each form of the intonation guide wiring extends from the instrument to a remote signal element or elements at least, and preferably to an indicator unit in or on which the signal element or elements and in some forms also other parts of the guide are mounted, it is preferred to interrupt such wiring and apply a plug-type connector to the wiring for connecting and disconnecting the same at the interruption. In so doing, the instrument may be disconnected from the indicator unit for separate portability, or the instrument and indicator may be separately portable. In the case of a cello as the string instrument (FIG. 1), the connector 170 may advantageously provide ring-shaped male and female companion parts 170 and 172, of which part 172 is applied over the end pin 54 of the instrument and held thereto by a set screw, for example, while the other part 170 is passed over the end pin 54 and plugged into the part 172.

What is claimed is:

1. A pitch intonation guide for a player of a string instrument with a fingerboard and a nut thereon, for playing on the strings groups of notes in associated series of finger positions on the fingerboard at different spacing, respectively, from the nut, providing first and second signal means within signal perception by the player of the instrument; first and second electrical circuitry for the respective first and second signal means, including a plurality of normally open first and second switches of which each first and each second switch is closable to close the respective first and second circuitry for signal emission from the respective first and second signal means, and first and second tabs associated with said first and second switches, respectively, with each tab being mounted on the fingerboard underneath the strings thereon and operative to close the associated switch by the player's finger pressure against said tab in fingering any of said strings, said tabs being arranged in pairs, of which each pair provides a first and second tab at one of said series of finger positions and so spaced from each other that both tabs are within pressure reach of the player's finger for playing any note of the associated group at the correct pitch, but only either one of the tabs is within pressure reach of the player's finger for playing the same note at off-pitch.

2. A pitch intonation guide for a player of a string instrument with a fingerboard having a non-fretted fingering surface and a nut thereon, for playing on the strings groups of notes in associated series of finger positions on said fingering surface at different spacing, respectively, from the nut, providing soundless signal means within signal perception by the player of the instrument; electrical circuitry therefor, including at least one normally open switch closable to close the circuitry for a signal emission, a tab mounted on the finberboard underneath the strings thereon and operative to close said switch by the player's finger pressure against said tab in fingering any of the strings, the finger positions of any of said series being distinguishable between first and second finger placements in which to play any note of the associated group at correct and incorrect pitch, respectively, with said tab being located within pressure reach of the player's finger in one of said finger placements of one of said series of finger positions, and a cover on said fingering surface hiding said tab from view and keeping said fingering surface plane throughout but yielding to the player's finger pressure in said one finger placements for operation of said tab, whereby initial fingering of a string for playing an intended note is left solely to the player's fingering skill.

3. A pitch intonation guide as in claim 2, in which the electrical circuitry includes a plurality of normally open switches each closable to close the circuitry for a signal emission, and tabs associated with said switches, respectively, with each tab being mounted on the fingerboard underneath the strings thereon, and said tabs being located within pressure reach of the player's finger in one of said finger placements of the respective series of finger positions.

4. A pitch intonation guide as in claim 3, in which said tabs are located within pressure reach of the player's finger in said first finger placements of the respective series of finger positions.

5. A pitch intonation guide for a player of a string instrument with a fingerboard having a non-fretted fingering surface and a nut thereon, with the instrument being adapted for playing on the strings groups of notes in associated series of finger positions on said fingering surface at different spacing, respectively, from the nut, said guide providing an electric power source; an electric soundless signal element; a circuit for said signal element, including amplifying means powered from said source and one part of a capacitor in the form of a tab mounted on the fingerboard underneath all strings thereon and connected with said amplifying means, with the other part of the capacitor being a player's finger on any of said strings above said tab to induce in the latter a signal amplified by said amplifying means, with said amplifying means being arranged to respond to an amplified signal for drawing current from the source through said signal element for a signal emission, a player's finger positions of any of said series being distinguishable between first and second finger placements in which to play any note of the associated group at correct and incorrect pitch, respectively, with said tab being located on the fingerboard in signal-inducing relation with the player's finger in one of said finger placements of one of said series of finger positions; and an insulation cover on said fingering surface hiding said tab from view and keeping said fingering surface plane throughout, whereby initial fingering of a string for playing an intended note is left solely to the player's fingering skill.

6. A pitch intonation guide as in claim 5, in which said circuit includes a plurality of said tabs each extending across all strings on the fingerboard and connected with said amplifying means, with said tabs being located on said fingerboard in signal-inducing relation with the player's finger in one of the finger placements of the respective series of finger positions.

7. A pitch intonation guide as in claim 6, in which said tabs are formed by conductive metal strips and electric insulation covering thereon, of which the covering is formed by said insulation cover on said fingering surface.

8. A pitch intonation guide as in claim 7, in which said insulation cover is of sheeting of uniform thickness, and said metal strips are of foil thickness so as to be imperceptible to the player's touch in playing the instrument.

* * * * *